United States Patent Office 3,663,689
Patented May 16, 1972

3,663,689
DESTAINED GENTIAN VIOLET AND METHOD
Karl J. Karnaky, Houston, and James E. McShane, Dallas,, Tex., assignors to Savage Laboratories, Inc., Houston, Tex.
No Drawing. Continuation-in-part of application Ser. No. 614,797, Feb. 9, 1967, which is a continuation-in-part of application Ser. No. 266,487, Mar. 20, 1963, which in turn is a continuation-in-part of application Ser. No. 730,534, Apr. 24, 1958. This application July 14, 1969, Ser. No. 841,560
Int. Cl. A61k 9/00; A61l 23/00
U.S. Cl. 424—45
8 Claims

ABSTRACT OF THE DISCLOSURE

A destained gentian violet mixture comprising from about 22 to about 27 parts of a clay or clays from the montmorillonite group absorbing from about 0.25 to about 3.00 parts gentian violet. From about 7 to about 14 parts of polyvinylpyrrolidone (plasdone) may be added. The clay or the combined clay and polyvinylpyrrolidone should comprise not less than 16 parts by weight to each part of gentian violet. Bentonite and a mixture of bentonite and kaolin are preferred. Cornstarch may be added. A suitable solvent, such as water, the alcohols, chloroform, and the like are used in preparing the destained gentian violet mixture. The preparation may be in the form of a cream, an aerosol foam, an aerosol powder, a powder, a jelly or a tablet. In a cream or foam form the clay or mixture of clay from about 22% to about 27% and plasdone in excess of 7%, preferably 9–14%, of the total products should be present. Dispersing agents, solubilizing agents, viscosity regulators, wetting agents, antiseptics, preservatives and the like may be incorporated in the preparation.

CROSS REFERENCE TO RELATED APPLICATIONS

The present application is a continuation-in-part of application Ser. No. 614,797, filed Feb. 9, 1967, entitled Destained Gentian Violet and Method, which is a continuation-in-part of application Ser. No. 266,487, filed Mar. 20, 1963 entitled Destained Preparation and Method, which in turn is a continuation-in-part of application Ser. No. 730,534, filed Apr. 24, 1958, all of which are now abandoned in favor of this application.

BACKGROUND OF THE INVENTION

Field of the invention

The present invention relates to a gentian violet composition and methods of its production. More specifically, it relates to a gentian violet adsorption complex which is nonstaining, will not leak from the vagina in use and has use as a pharmaceutical and medication in which the medicinal properties of gentian violet are not impaired.

Description of the prior art

The prior art includes the references cited in the related applications indicated under the cross references to them. These include volume 16, No. 8, Journal of the American Pharmaceutical Association, page 506 of August 1955; Becker, American Professional Pharmacists, volume 20, No. 10, pages 939–949 of October 1964; and U.S. patents to Hoskins, 2,088,417; to Bour 2,288,389; to Abramson 3,146,162; to Mueller, 3,137,622; to Barr 2,918,405; and to Cronin 2,897,120.

Of these references, the only which has a disclosure of gentian violet combined with a clay, such as bentonite is J.A.P.A. This reference, however, teaches that in a ratio of one part gentian violet to ten parts bentonite, gentian violet is inactivated. In a range including this ratio of gentian violet to bentonite, by the addition of sufficient polyvinylpyrrolidone to make a fluid preparation, the gentian violet-bentonite adsorption complex is rendered so that the gentian violet will leach out of the preparation and be effective rather than inactivated. By providing not less than 16 parts of bentonite to each part of gentian violet, the gentian violet is not inactivated.

SUMMARY OF THE INVENTION

The present invention relates to destained gentian violet and methods of its preparation which otherwise would stain the user and apparel of the user coming into contact with gentian violet.

Gentian violet has a deep purple color and has powerful and permanent staining properties. It does not come out of clothes and remains on the skin and other tissues and structures of the body, as well as garments and the like for long periods of time. The staining properties of gentian violet are so permanent that it has had wide usage as gun blueing.

Gentian violet is a very powerful antiseptic with no topical toxicity (except in ophthalmic application). For example, it can be applied many times to the mouths of children without any injurious effects. Most bacteria, and especially the Gram-positive ones, are killed almost immediately on contact with gentian violet. It has been known for years that gentian violet is ideal for the destruction of most fungi (molds-yeast). A few applications of gentian violet have been found to be the best for the destruction of the most common fungus, Candida (monilia) Albicans which affects man so often and produces intense itching and burning of that part of the body affected.

The great disadvantage and drawback to the use of gentian violet is the messiness and almost permanent staining produced. Also, in vaginal and cervical infections, gentian violet causes a great deal of staining to underclothes, and, in many instances, permanently stains outer wearing apparel so that the user may never be able to wear such apparel in public. In addition, gentian violet stains laboratory bowls, towels, and the like and almost everything coming into contact with it. For many years gentian violet has been used in treating vaginal mycosis, but due to its permanent staining properties its use to a large extent has been discontinued and less effective medications, such as the antibiotics, have been used which is believed to be the reason that vaginal mycosis has become more and more prevalent.

The present invention is also directed to not only making gentian violet nonstaining, but to improve it so that it will not leak from the vagina to the outside, but will remain adhered to the vaginal walls and cervix for seven or more days.

The method includes dissolving gentian violet, an aniline dye, in a suitable solvent, such as water, the alcohols, chloroform and the like, or utilizing an aqueous or other solution of gentian violet and slowly adding to it a clay or mixtures of clay from the montmorillionite group, such as bentonite, kaolin, attapulgite and the like. The clay or mixture of clays adsorb the oppositely charged cationic gentian violet in a nonexchangeable or difficult exchangeable state. Gentian violet is positively charged and its cations are attracted to and fixed to the negatively charged surface of the anionic clay. The aqueous solution of gentian violet and the clay form a putty-like material when mixed with a suitable solvent, such as water, in which the gentian violet is bound to the clay. Polyvinylpyrrolidone (plasdone) is added to make a fluid-like consistency which permits the clay bound gentian violet to be more loosely adsorbed to the clay. In addition plasdone permits the release of water held by the clay. For example, the chemistry of benttonite is such that gentian violet is adsorbed onto the anionic lattice structure of the bentonite molecule. The addition of plasdone, within the limits set forth, alters the adsorptive property of the bentonite molecule in such fashion that gentian violet is slowly released from the mixture and bound to proteinaceous and polysaccharide materials in the surrounding environment. This "metered release" or "stand by" availability of gentian violet does not permit the flooding of the enviroment with gentian violet and the gross staining effect formerly associated with the use of gentian violet containing medicinial products. In the form of a cream or foam, plastdone should not be used in excess of 7% by weight and preferably about 9–14%. Gentian violet may vary from about 0.25% to about 3% by weight of the total preparation and the clay from about 22% to about 27% by weight of the total preparation. Depending on the dosage form, dispersing agents, such as corn starch, a solubilizing agent, such as propylene glycol, a viscosity regulator, such as glycerine, wetting agents, an antiseptic, a carrier and foaming agents may be incorporated in the preparation. The final product may be in the form of a cream, a foam, a powder, tablets and the like. If in the form of a cream a suitable carrier, such as castor oil may be used. In all dosage forms, the ratio should be 0.25–3.00 parts gentian violet, 22–27 parts clay or mixtures of clay and 7–14 and preferably 9–14 parts plasdone. Preferably, 22–24 parts bentonite, and 3–5 parts kaolin are used as the clay. Kaolin is a more coarse clay and has a lower degree of adsorptivity than bentonite and is added for bulk.

DESCRIPTION OF THE PREFERRED EMBODIMENT

The preparation is a homogeneous gentian violet adsorption complex. Gentian violet may be present in an amount of 0.25% to about 3.00% by weight of the total preparation. A clay of the montmorillonite group of clays is satisfactory, preferably bentonite, however, kaolin, attapulgite and the like, or mixtures of such clays are satisfactory. The clay or mixtures of clay should be present in an amount from about 22% to about 27% by weight of the total preparation.

A dispersing agent, such as corn starch may be added in an amount of about 0.1% to about 1.0% to prevent clumping of the clay, such as bentonite. The swelling of the corn starch when slowly added to the mixture breaks up the clumps of the clay or bentonite to insure a homogeneous mixture. This is particularly useful when the gentian violet adsorption complex is in the form of an aerosol spray to insure flowing of the foam from a container.

Polyvinylpyrrolidone (plasdone) is present in an amount of not less than about 7% by weight of the total product, and preferably from about 9% to about 14% by weight of the final product. As previously mentioned, a dispersing agent, such as corn starch, a solubilizing agent such as propylene glycol, a viscosity regulator, such as glycerine, wetting agents, dioctylsodium sulfosuccinate and sodium lauryl-sulfate may be used. Also, an antiseptic agent to prevent fungus growth and the like may be used, such as benzalkonium chloride.

The pH of the mixture may range from about 2.0 to about 10.0 without altering its efficiency and the solution can be incorporated in a powder, tablets, jellies, creams, oils, aerosol foams and the like. For example, if in the form of a foam, a foaming agent such as polysorbate 80 can be used.

The following examples are illustrate of specific examples of the invention:

EXAMPLE I

In this example 13.50 grams of gentian violet was added to about 300 ml. of water. The mixture was agitated to disperse and partially dissolve the gentian violet. A mixture consisting of 130.1 grams of polyvinylpyrrolidone, 2221.7 grams of bentonite (U.S.P.), 47.4 grams of kaolin, and 24.50 grams of corn starch was added slowly with stirring giving a liquid of smooth consistency. To this mixture was added 1.30 grams of benzalkonium chloride, 2.37 grams of dioctylsodium sulfosuccinate, 3.27 grams of sodium lauryl sulfate and 2.43 grams of polysorbate 80 (U.S.P.). To this was added 84.9 grams of propylene glycol, 50 grams of glycerine, and then sufficient water to produce 1 kilogram of liquid. This product contained 1.35% gentian violet and is suitable in aerosol containers to produce a non-staining foam. This produced a gentian violet adsorption complex of the following proportions:

| | Percentage by wt. |
|---|---|
| Gentian violet | 1.35 |
| Polyvinylpyrrolidone | 13.01 |
| Bentonite | 22.17 |
| Kaolin | 4.74 |
| Cornstarch | 2.45 |
| Benzalkonium chloride | 0.13 |
| Dioctylsodium sulfosuccinate | 0.237 |
| Sodium lauryl sulfate | 0.327 |
| Polysorbate 80 | 0.243 |
| Propylene glycol | 8.49 |
| Glycerine | 5.00 |
| Water | Remainder |

EXAMPLE II

In this example 13.50 grams of gentian violet was added to about 300 ml. of water. To this was added a mixture of 90.0 grams polyvinylpyrrolidone, 220 grams of bentonite and 50 grams of kaolin while stirring slowly giving a liquid of smooth consistency. To this liquid was added 1.30 grams of benzalkonium chloride, 2.37 grams of dioctylsodium sulfosuccinate, 3.27 grams of sodium lauryl sulfate, 2.43 grams of polysorbate 80 (U.S.P.) and sufficient water to produce 1 kilogram of liquid. This product contained 1.35% gentian violet, glycerine, corn starch, and propylene glycol were eliminated, and is suitable in aerosol containers to produce a non-staining foam. This produced a gentian violet adsorption complex of the following composition:

| | Percentage by wt. |
|---|---|
| Gentian violet | 1.35 |
| Polyvinylpyrrolidone | 9.00 |
| Bentonite | 22.00 |
| Kaolin | 5.00 |
| Benzalkonium chloride | 0.13 |
| Dioctylsodium sulfosuccinate | 0.237 |
| Sodium lauryl sulfate | 0.327 |
| Polysorbate 80 | 0.243 |
| Water | Remainder |

EXAMPLE III

This example is the same as Examples I and II except that kaolin was omitted and the amount of bentonite was increased in the amount of the kaolin.

EXAMPLE IV

In this example a preparation was made in accordance with Example I except that the following amounts of gentian violet, bentonite and plasdone were used as set forth in Table I.

TABLE I

| Parts or percent | | |
|---|---|---|
| Gentian violet | Bentonite | Plasdone |
| 0.25 | 22.16 | 13.00 |
| 0.50 | 22.16 | 13.00 |
| 0.75 | 22.16 | 13.00 |
| 1.00 | 22.16 | 13.00 |
| 1.25 | 22.16 | 13.00 |
| 1.50 | 22.16 | 13.00 |
| 1.75 | 22.50 | 13.23 |
| 2.00 | 22.80 | 13.42 |
| 2.25 | 23.06 | 13.60 |
| 2.50 | 23.30 | 13.75 |
| 2.75 | 23.51 | 13.89 |
| 3.00 | 23.70 | 14.01 |

This resulted in satisfactory products.

EXAMPLE V

In this example, attapulgite clay was substituted for bentonite in the preceding examples and in the same amounts which produced a satisfactory destained gentian violet component.

EXAMPLE VI

In this example the following preparations were made. One was in the form of a cream, the other in the form of a foam suitable for an aerosol container.

TABLE II

|  | Parts or percentage by weight | |
| --- | --- | --- |
|  | Cream | Foam |
| Gentian violet | 1.35 | 1.35 |
| Polyvinylpyrrolidone | 9.00 | 13.00 |
| Bentonite | 22.00 | 22.00 |
| Kaolin | 4.70 | 4.70 |
| Propylene glycol | 8.00 | 8.50 |
| Polysorbate 80 | 10.00 | 0.20 |
| Cornstarch |  | 0.10 |
| Glycerine |  | 5.00 |
| Benzalkonium chloride |  | 0.10 |
| Dioctylsodium sulfosuccinate |  | 0.20 |
| Sodium lauryl sulfate |  | 0.33 |
| Castor oil | 25.80 |  |
| Water | 18.80 | 43.50 |

These were satisfactory nonstaining gentian violet adsorption complex preparations.

EXAMPLE VII

This example is similar to that of Example I and has the following composition:

| | Percentage by wt. |
| --- | --- |
| Gentian violet | 1.35 |
| Polyvinylpyrrolidone | 13.01 |
| Bentonite | 22.17 |
| Cornstarch | 2.20 |
| Kaolin | 4.20 |
| Glycerine | 5.00 |
| Sodium lauryl sulfate | 0.327 |
| Polysorbate 80 | 0.243 |
| Potassium alum | 0.300 |
| Tartaric acid | 0.600 |
| Potassium bitartrate | 0.100 |
| Water | 42.11 |

EXAMPLE VIII

In this example, isopropyl alcohol, ethyl alcohol, methyl alcohol and chloroform are each substituted for the water in Example VII.

EXAMPLE IX

The amounts of the components may vary, other than the ratio of gentian violet, clay and plasdone, depending on the dosage form of the product, whether a foam, cream, powder, tablet or the like. These may all be determined by simple experimentation and it is deemed unnecessary to set forth any more specific ratios as to do so would unduly lengthen and complicate the disclosure. Thus, no more examples are deemed necessary, because if the clay material has the property of adsorbing the gentian violet and is inert, any such material may satisfactorily be used. The preservatives, spreading agents, wetting agents, viscosity control agents, dispersing agents, foaming agents, carriers and the like may be omitted, but in practice depending on the dosage form it may be desirable to have them as mentioned. In this connection, some preservatives have fungicidal properties, such as propylene glycol, which are especially advantageous in the invention. Any suitable solvent may be used, such as water, which is preferred, the alcohols, chloroform and the like to provide a suitable solution.

Accordingly, the present invention is well adapted to attain the ends and has the advantages and features mentioned as well as others inherent therein.

Many uses and adaptations, substitutions, equivalents and rearrangements of the present invention will occur to those skilled in the art which are encompassed in the invention as defined by the scope of the appended claims.

What is claimed is:

1. A destained gentian violet preparation comprising a homogeneous mixture of gentian violet, montmorillonite clay and polyvinylpyrrolidone in the following ratio:
   from about 0.25 to about 3.00 parts of the gentian violet,
   from about 22 to about 27 parts of the clay, and
   from about 7 parts to about 14 parts of the polyvinylpyrrolidone whereby the gentian violet is adsorbed by the clay.

2. The destained gentian violet preparation of claim 1 where,
   the polyvinylpyrrolidone is present in an amount of from about 9 parts to about 14 parts, and
   where the clay is bentonite.

3. The destained gentian violet preparation of claim 2 where,
   the clay comprises a mixture of from about 22 to about 24 parts bentonite and from about 3 parts to about 5 parts kaolin.

4. The destained gentian violet preparation of claim 1 including, additionally, cornstarch in an amount of from 0.1 to about 1.0% by weight of the total preparation.

5. The destained gentian violet preparation of claim 1 where,
   the form of the preparation is an aerosol foam, and additionally
   includes cornstarch in an amount of from about 0.1 to about 1.0 part by weight of the total preparation.

6. A method of destaining gentian violet comprising, adding to and thoroughly mixing with an aqueous solution of gentian violet a montmorillonite clay capable of adsorbing the gentian violet, and
   adding polyvinylpyrrolidone to the resulting mixture, the ratio of the gentian violet, the clay, and the polyvinylpyrrolidone being as follows:
   from about 0.25 to about 3.0 parts of gentian violet,
   from about 22 to about 27 parts of the clay, and
   from about 7 parts to about 14 parts of the polyvinylpyrrolidone.

7. The method of claim 6 where,
   the polyvinylpyrrolidone is present in an amount of from about 9 parts to about 14 parts, and
   where the clay is bentonite.

8. The method of claim 7 where the clay comprises a mixture of,
   about 22 parts to about 24 parts of the bentonite, and from about 3 parts to about 5 parts kaolin.

References Cited

UNITED STATES PATENTS

| | | | |
| --- | --- | --- | --- |
| 2,783,182 | 2/1957 | Nelson | 424—80 |
| 3,146,162 | 8/1964 | Abramson | 424—155 |
| 2,088,417 | 7/1937 | Hoskins | 252—309 B |
| 2,288,389 | 6/1942 | Bour | 41—31.6 |
| 3,137,622 | 6/1964 | Mueller | 424—155 |

OTHER REFERENCES

J.A.PH.A. prac pharm ed. 16:8, p. 506 (August 1955).

The Dispensatory of The U.S.A., J. B. Lippincott, Co., Phila., 24th ed. (1947), pp. 140–1, 606–8, 658–9.

Kerr, Chemistry & Ind. of Starch, Academic Pres, N.Y. (1944), pp. 106–7, 140, 156–160.

ALBERT T. MEYERS, Primary Examiner

A. P. FAGELSON, Assistant Examiner

U.S. Cl. X.R.

424—80, 154, 330